Patented Mar. 8, 1949

2,464,167

UNITED STATES PATENT OFFICE 2,464,167

PROCESS FOR THE RECOVERY OF PENTAERYTHRITOL

Joseph A. Wyler, Allentown, Pa., assignor to Trojan Powder Company, Allentown, Pa.

No Drawing. Application August 1, 1945, Serial No. 608,351

4 Claims. (Cl. 260—637)

This invention relates to a process for the recovery of pentaerythritol from mixtures and solutions comprising pentaerythritol, calcium formate and the syrupy products formed during the reaction between formaldehyde and acetaldehyde in aqueous alkaline medium, said alkalinity being maintained by means of hydrated lime.

Present commercial processes for the preparation of pentaerythritol are based upon the reaction of one molecule of acetaldehyde with about four molecules of formaldehyde in aqueous alkaline media at temperatures of about 20° C. to 50° C. and in such a volume of water as to provide a solution containing less than 20% of aldehydes at the beginning of the condensation. The following equation is representative of the main reaction:

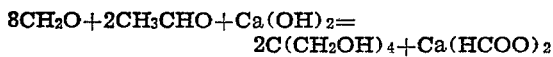

$$8CH_2O + 2CH_3CHO + Ca(OH)_2 = 2C(CH_2OH)_4 + Ca(HCOO)_2$$

This reaction, however, does not convey a complete picture of the chemical changes involved and it is now known that several chemical reactions take place simultaneously and consecutively to form by-products as dipentaerythritol, molecular complexes of pentaerythritol and dipentaerythritol, syrupy products, etc.

In those processes in which lime is used as condensation agent the mixture resulting from the condensation contains appreciable insoluble matter which is usually filtered off, providing a relatively clear filtrate containing about 6 parts of calcium formate and approximately 1 part, or more, of syrupy materials for each 10 parts of pentaerythritol.

One commercial process for the recovery of pentaerythritol from solutions of the type mentioned above is based upon a separation of the calcium formate from the hot concentrated liquors, filtering or centrifuging to separate the crystals of calcium formate from the hot solution which is substantially saturated with pentaerythritol at this separation temperature, cooling this hot clear liquor to effect the crystallization of pentaerythritol in substantial amounts, centrifuging these crystals to obtain relatively pure pentaerythritol and a mother liquor containing some pentaerythritol, calcium formate and syrupy materials.

It is an object of this invention to provide a short process for the recovery of calcium formate and of pentaerythritol in high yields from mixtures of the nature described above. Another object is to provide a method for obtaining a more perfect separation of calcium formate from pentaerythritol. A still further object is to recover additional amounts of pentaerythritol, from the mother liquors, in a highly valuable form. Other and further objects will become apparent upon a perusal of this specification.

The following example, in which all parts are by weight, illustrates how the calcium formate-pentaerythritol solutions are usually obtained in industry.

1066 parts of water are placed in a suitable reaction kettle provided with a stirrer, 396 parts of 30% formaldehyde solution added, then a small fraction of 53 parts of $Ca(OH)_2$ in the form of a slurry with 160 parts of water is added followed by the slow addition of 45 parts of 99% acetaldehyde, the mixture being stirred continuously.

The lime is added over a period of about 2 hours and the acetaldehyde over about 1½ hours. The temperature is maintained at about 30° C.

The whole mixture is stirred until an iodine titration indicates the presence of only about 0.10% $CH_2O$ in the mixture, when it is filtered to separate the insoluble impurities as $Ca(OH)_2$, $CaCO_3$, $Al_2(OH)_3$, $Mg(OH)_2$ etc., and to furnish a clear solution containing pentaerythritol, dipentaerythritol, calcium formate, syrupy polyhydroxy-materials, etc.

The details of the process described above are not part of the present invention but are given to show how the mixtures used in my process may be prepared.

The clear filtrate obtained in the above example is usually slightly alkaline due to the presence of basic formate of calcium and its alkalinity is usually removed by the addition of a small amount of formic acid. This slightly acid liquor serves as the starting material for my process.

It is known that if the slightly acid liquor of the type described above is placed in a suitable evaporator provided with agitation or stirring, and the liquor evaporated until the crystallization point of the pentaerythritol in the liquor is about 90° C., that when this point is reached, somewhat less than 60% of the calcium formate originally present in the liquor will have precipitated out, whereas the pentaerythritol and the syrupy products will be in solution. The mixture, at this stage, is usually rather viscous and can usually be successfully passed through a hot centrifugal for the purpose of separating the crystals of calcium formate from the pentaerythritol-containing liquor. However, the yields of calcium formate obtained in the centrifugal are usually less than 60% of theory and the yields of pentaerythritol obtained upon cooling the liquor from the centrifugal and centrifuging this liquor are usually less than about 55% of theory. If the liquor is evaporated to a higher crystallization point for the pentaerythritol than about the 90° C., mentioned above, the whole mixture becomes unmanageable in the centrifugal and hardens and clogs up the apparatus.

I have discovered that if, a liquid, water soluble, aliphatic polyhydroxy alcohol such as glycerine, glycol, propylene glycol, and diethylene glycol, each of which contains not more than three hydroxyl groups to the molecule, is added to the liquor before the final evaporation, the evaporation can be carried out to form a more concentrated solution of pentaerythritol and also to a point at which substantially more calcium formate is precipitated out without having a co-precipitation of pentaerythritol or clogging difficulties in the hot centrifugal. The effect of these polyhydroxy alcohols is to precipitate the calcium formate and to keep the pentaerythritol and mother liquor in solution while simultaneously forming a valuable, non-viscous mixture which can be readily centrifuged and handled in the hot, thus providing a substantially greater yield of calcium formate in the hot and of pentaerythritol in the cold.

The proportion and type of liquid polyhydroxy alcohol to use is selected in accordance with the type of pentaerythritol liquor being used and also the use which is to be made of the mother liquor obtained when the pentaerythritol crystals are later separated. In general, the addition of an amount of the polyhydroxy alcohol equal to about 20% or more of the weight of the pentaerythritol in the liquor is sufficient and considered to be an effective amount, but I may use as much as 50% or even more, particularly when the final mother liquors are to be used for the manufacture of certain types of lacquers. The added polyhydroxy alcohol serves not only to cause greater initial yields of pentaerythritol and calcium formate but also to provide a pentaerythritol-containing mother liquor of a valuable composition.

In plant practice it may, at times, be advisable to wash the hot calcium formate cake in the hot centrifugal with the hot wash liquor from a previous batch and then with pure hot water in order to obtain a calcium cake containing less than 0.2% of polyhydroxy materials.

Also, when the liquor obtained from the hot calcium formate separation is cooled it is preferable to cool slowly with occasional or slow stirring in order to obtain the pentaerythritol crystals in relatively coarse condition. These coarse crystals are more amenable to water washing and enable the plant operator to obtain a purer product with a minimum of effort.

My process, in short, comprises evaporating the slightly acid pentaerythritol liquor, prepared as above, to relatively small volume, adding thereto the desired amount of the liquid, water soluble, aliphatic polyhydroxy alcohol, continuing the evaporation at elevated temperatures to a pentaerythritol crystallization point higher than about 90° C., separating the precipitated calcium formate at temperatures above the crystallization point of the pentaerythritol in the solution, washing the separated calcium formate with hot water, cooling the hot liquor obtained in this separation to effect the crystallization of the pentaerythritol, separating these crystals from the cold mother liquor, washing with cold water and drying the pentaerythritol crystals.

As stated later herein glycerine is preferred as the polyhydric alcohol to be used in my process. In a typical example this polyhydric alcohol is used with the "clear filtrate" referred to above as being usually slightly alkaline and as serving as a starting material for my process. The glycerine is used within the range of proportions stated, namely 20% to 50% or more of the weight of the pentaerythritol in the said filtrate. The procedure is as described in general above for the treatment of this filtrate or liquor with polyhydric alcohols.

The mother liquor thus obtained contains pentaerythritol, syrupy products, calcium formate, the added polyhydroxy alcohol, water and other materials. To be useful for the preparation of resins suitable for the formulation of lacquers, it may be treated with oxalic acid alone, or with sulfuric acid to precipitate most of the calcium, with oxalic acid to remove the last traces of the latter and with barium carbonate to remove the sulfate ion. The filtered calcium-free liquor is evaporated to a low water content and the resulting viscous liquor is now ready for use in the preparation of resins by esterification with suitable acids.

Of the various water soluble, aliphatic, polyhydroxy alcohols used, glycerine is preferred as being best adapted for the precipitation of the calcium formate while simultaneously providing a pentaerythritol-containing mother-liquor of value in resin manufacture. However, in certain cases the use of glycol is preferable, particularly when the mother liquor is to be used with other glycol esters.

Throughout the specification and claims the term "pentaerythritol" is intended to cover pentaerythritol as well as the dipentaerythritol and minor amounts of polypentaerythritols usually associated with it. The grade of "pentaerythritol" usually obtained by my process is particularly adapted to the preparation of esters and resins useful in the formulation of lacquers.

It will be apparent to persons skilled in this art that many modifications can be made of my process without departing from the essence of the invention. Thus the temperature to which the liquor is evaporated to effect the final precipitation of the calcium formate may be varied considerably and may be as high as 120° C. or even higher, bearing in mind that the higher this temperature the more effective is the separation of the calcium formate and the greater is the yield of pentaerythritol obtained in one operation; also, the amount of added liquid, aliphatic polyhydroxy alcohol used is dependent somewhat upon the skill of the operator, although in general an amount equal to about 25% of the weight of the pentaerythritol is usually preferable; also, the evaporation may be conducted below or above atmospheric pressure and the separation of the calcium formate crystals may be carried out in a pressure filter, a centrifugal, or any other suitable apparatus.

I claim:

1. In the recovery of pentaerythritol from aqueous mixtures containing pentaerythritol, calcium formate, and the syrupy products formed during the condensation of formaldehyde and acetaldehyde in an aqueous medium including lime to establish alkalinity, the method which comprises adding an acidic substance to acidify the mixture, evaporating the mixture to relatively small volume, adding a liquid aliphatic water-soluble polyhydric alcohol containing not more than three hydroxyl groups to the molecule, in substantial proportion serving to increase materially the amount of calcium formate precipitated from the mixture without coprecipitation of pentaerythritol, continuing the evaporation at a temperature above approximately 90° C. until the concentration of the pentaerythritol in the mixtures becomes so high that its crystallization point is at least approximately 90° C., separating the calcium formate that precipitates during the processing described from the solution, this separation being effected at a temperature above the said crystallization point, and then cooling the solution remaining after the said separation, so as to cause crystallization of pentaerythritol from the solution.

2. The method described in claim 1, the polyhydric alcohol used being glycerine.

3. The method described in claim 1, the polyhydric alcohol used being ethylene glycol.

4. The method described in claim 1, the proportion of the polyhydric alcohol being about 20 to 50 parts for 100 parts by weight of pentaerythritol in the said mixture.

JOSEPH A. WYLER.

REFERENCES CITED

The following references are of record in the file of this patent:

UNITED STATES PATENTS

| Number | Name | Date |
|---|---|---|
| 2,360,186 | Wyler | Oct. 10, 1944 |
| 2,372,555 | Cox | Mar. 27, 1945 |

FOREIGN PATENTS

| Number | Country | Date |
|---|---|---|
| 298,932 | Germany | Dec. 12, 1919 |